(12) United States Patent
Rodriguez

(10) Patent No.: US 11,232,503 B1
(45) Date of Patent: Jan. 25, 2022

(54) SYSTEM AND METHOD FOR BLOCKCHAIN-BASED PRODUCT CONFIGURATION AND REFERRAL

(71) Applicant: Amazon Technologies, Inc., Seattle, WA (US)

(72) Inventor: Daniel del Hoyo Rodriguez, Madrid (ES)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 420 days.

(21) Appl. No.: 16/139,557

(22) Filed: Sep. 24, 2018

(51) Int. Cl.
| | |
|---|---|
| *G06Q 30/00* | (2012.01) |
| *G06Q 30/06* | (2012.01) |
| *G06Q 20/38* | (2012.01) |
| *H04L 9/06* | (2006.01) |
| *G06F 9/455* | (2018.01) |
| *G06F 9/54* | (2006.01) |
| *G06F 16/27* | (2019.01) |

(52) U.S. Cl.
CPC ..... *G06Q 30/0621* (2013.01); *G06F 9/45504* (2013.01); *G06F 9/542* (2013.01); *G06F 16/27* (2019.01); *G06Q 20/382* (2013.01); *G06Q 30/0603* (2013.01); *G06Q 30/0613* (2013.01); *H04L 9/0637* (2013.01)

(58) Field of Classification Search
CPC ............ G06Q 30/0601–0645; G06Q 30/08
USPC ............................................... 705/26.1–27.2
See application file for complete search history.

(56) References Cited

U.S. PATENT DOCUMENTS

| | | | | |
|---|---|---|---|---|
| 10,871,948 | B1* | 12/2020 | Dowling | H04L 9/3239 |
| 2008/0167946 | A1* | 7/2008 | Bezos | G06Q 30/0201 |
| | | | | 705/14.16 |
| 2012/0109777 | A1* | 5/2012 | Lipsitz | G06Q 30/02 |
| | | | | 705/26.5 |
| 2012/0290448 | A1* | 11/2012 | England | G06Q 30/0282 |
| | | | | 705/27.2 |
| 2017/0243179 | A1* | 8/2017 | Dehaeck | G06F 21/10 |
| 2018/0096175 | A1* | 4/2018 | Schmeling | G06Q 10/08 |

(Continued)

OTHER PUBLICATIONS

EY, microsoft launch blockchain solution for content rights and royalties management. (2018). SMB World Asia (Online), , n/a. Retrieved from https://dialog.proquest.com/professional/docview/2059209288?accountid=131444 (Year: 2018).*

(Continued)

*Primary Examiner* — Jeffrey A. Smith
*Assistant Examiner* — Lindsey B Smith
(74) *Attorney, Agent, or Firm* — Thomas | Horstemeyer, LLP

(57) ABSTRACT

Disclosed are various embodiments for blockchain-based product configuration and referral. An originator may interact with a product configuration service to generate a product combination, which may include a particular combination and arrangement of physical or virtual items. A blockchain data object may be generated that is unique to the product configuration. The blockchain data object may be inserted into a blockchain using a blockchain network service such that, when the product configuration is subsequently accessed or consumed by another user account, a predetermined task is performed in association with a user account of the originator.

17 Claims, 6 Drawing Sheets

(56) References Cited

U.S. PATENT DOCUMENTS

2019/0130345 A1* 5/2019 Antor .................... G06F 16/182
2019/0349371 A1* 11/2019 Smith ................. H04L 63/0884

OTHER PUBLICATIONS

How blockchain will disrupt your business [analysis], (Sep. 6, 2016). AllAfrica.Com Retrieved from https://dialog.proquest.com/professional/docview/1817340999?accountid=131444 (Year: 2016).*
Ginder-Vogel, Katie, Product Licensing: How to Turn Your Design into a Royalty Generating Machine, Mar. 28, 2016, fictiv.com, accessed at [https://www.fictiv.com/articles/product-licensing-how-to-turn-your-design-into-a-royalty-generating-machine] (Year: 2016).*

* cited by examiner

SYSTEM AND METHOD FOR BLOCKCHAIN-BASED PRODUCT CONFIGURATION AND REFERRAL

BACKGROUND

Various systems permit users to customize a piece of clothing, such as a t-shirt, hat, or a hoodie. For example, users may be able to select a design to be applied to a t-shirt and may purchase the design. Some systems may permit the user to share his or her design, however, the user may not be incentivized to do so.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to blockchain-based product configuration and referral. It may be desirable to allow users of a network site to interact with a product configuration service which permits the configuration of products using a network site or a client application, for instance, to customize an item or group of items in an electronic catalog. For example, a user may create an outfit by combining different fashion items, such as a shirt, hoodie, jacket, pants, shoes, accessories, undergarments, or other items. In some situations, the user may desire to share their customized outfit with their friends, family, or social media followers. However, it is possible that the outfit could go viral and the creator of the outfit will receive no acknowledgment or reward, which is a significant disincentive to interacting with the product configuration service.

To encourage users to share their customized outfits, it may be beneficial to reward the user that created the outfit, or other customized collection of items, with a reward or other benefit. However, to do so, the user may not be sufficiently incentivized unless the network site is committed to providing the reward or other benefit. It would not be efficient to create a binding contract or other agreement with each originator or for each product configuration, as hundreds to thousands of items customized could be created by hundreds to thousands of users.

According to various embodiments described herein, a user, referred to as an originator, may interact with a product configuration service to generate a product combination, which may include a particular combination and arrangement of physical or virtual items. A blockchain data object may be generated that is unique to the product configuration. The blockchain data object may include conditions agreed upon by the originator and a network site that cause predetermined tasks to be performed as conditions are satisfied. Further, the blockchain data object may be inserted into a blockchain using a blockchain network service such that, when the product configuration is subsequently accessed or consumed by another user account, a predetermined task is performed in association with a user account of the originator. In the following discussion, a general description of the system and its components is provided, followed by a discussion of the operation of the same.

Figure 1:
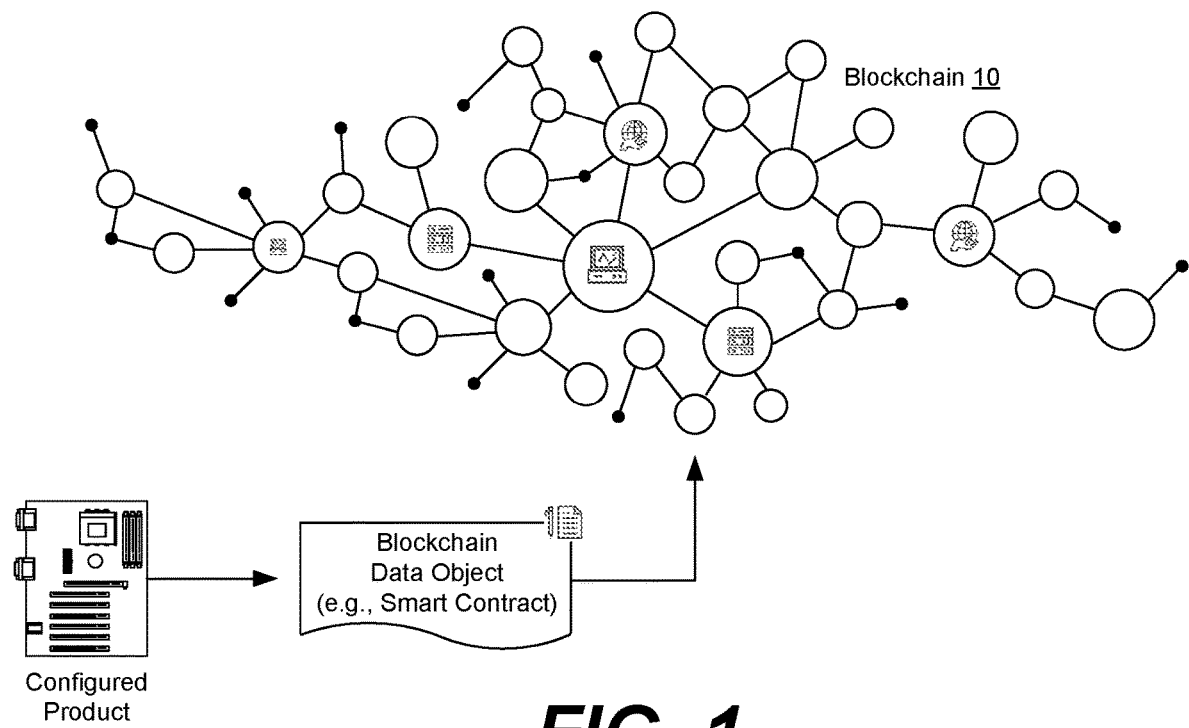
FIG. 1 is a schematic diagram of a blockchain according to various embodiments of the present disclosure.

Turning now to FIG. 1, a schematic diagram having a blockchain 10 is shown according to various embodiments. Generally, the blockchain 10 relates to a digital database having data that is distributed among hundreds to potentially thousands of devices in a common network. Blockchain protocols provide a decentralized and transparent ledger that tracks and stores data in a publicly verifiable and secure manner that also prevents unauthorized tampering and revision. Various blockchain protocols are popular for cryptocurrency as the blockchain 10 may be used as a digital ledger for cryptocurrency transactions. When data is inserted into the blockchain 10, each node in a network records or updates data independently, with a most popular version of the data identified across the blockchain 10 being the official version.

In addition to cryptocurrency transactions, smart contracts may be inserted into the blockchain 10 as a blockchain data object. As opposed to a legal contract, a smart contract may include data and machine-executable instructions that act as a third-party intermediary in a transaction or other exchange of obligations. For instance, data pertaining to an agreement made between AlphaCo and BetaCo may be inserted into the blockchain 10 as a blockchain data object and distributed among the nodes (e.g., devices) of the blockchain 10. When AlphaCo or BetaCo satisfy one or more conditions specified in the blockchain data object, a routine may be executed in a virtual machine or other service that causes one or more predetermined actions to be performed. As such, all actions after insertion of the blockchain data object detailing the agreement may be performed automatically when various conditions of the blockchain data object are satisfied.

According to various embodiments described herein, a computing environment may interact with a network service implementing a blockchain protocol to insert various blockchain data objects pertaining to configured products, or combination of products, into a blockchain. The blockchain protocol may include, for instance, a private blockchain protocol, a public blockchain protocol, a federate or consortium blockchain protocol, or a combination thereof. In some embodiments, the blockchain protocol include a smart contract protocol by Etherium™.

In some embodiments, the computing environment may generate a blockchain data object specifying terms for performing a task in association with an originator of a configured product. If the terms are satisfied, the task may be performed autonomously by the network service.

Accordingly, the use of the blockchain 10, as will be described, provides several technical benefits. First, the use of the blockchain 10 for storing agreements for product configurations provides additional network security as a blockchain data object may be distributed among several nodes in the blockchain 10, preventing the unauthorized modification of a product configuration data or an agreement related thereto. The blockchain 10 may also authenticate any transactions to modify the product configuration data or the agreement, and verify conditions, as opposed to a computing environment hosting a product configuration service. Second, the use of the blockchain 10 for storing product configurations or executable code associated therewith reduces computing resources and bandwidth required to otherwise perform tasks or other events in a computing environment. Notably, the processing of data may be off-loaded to a blockchain network service that is more efficient at processing blocks and is more scalable when additional computing resources are required. Third, the use of the blockchain 10 to store product configurations as blockchain data objects, or blocks, provides for increased customization and automation without requiring human interaction.

Figure 2:
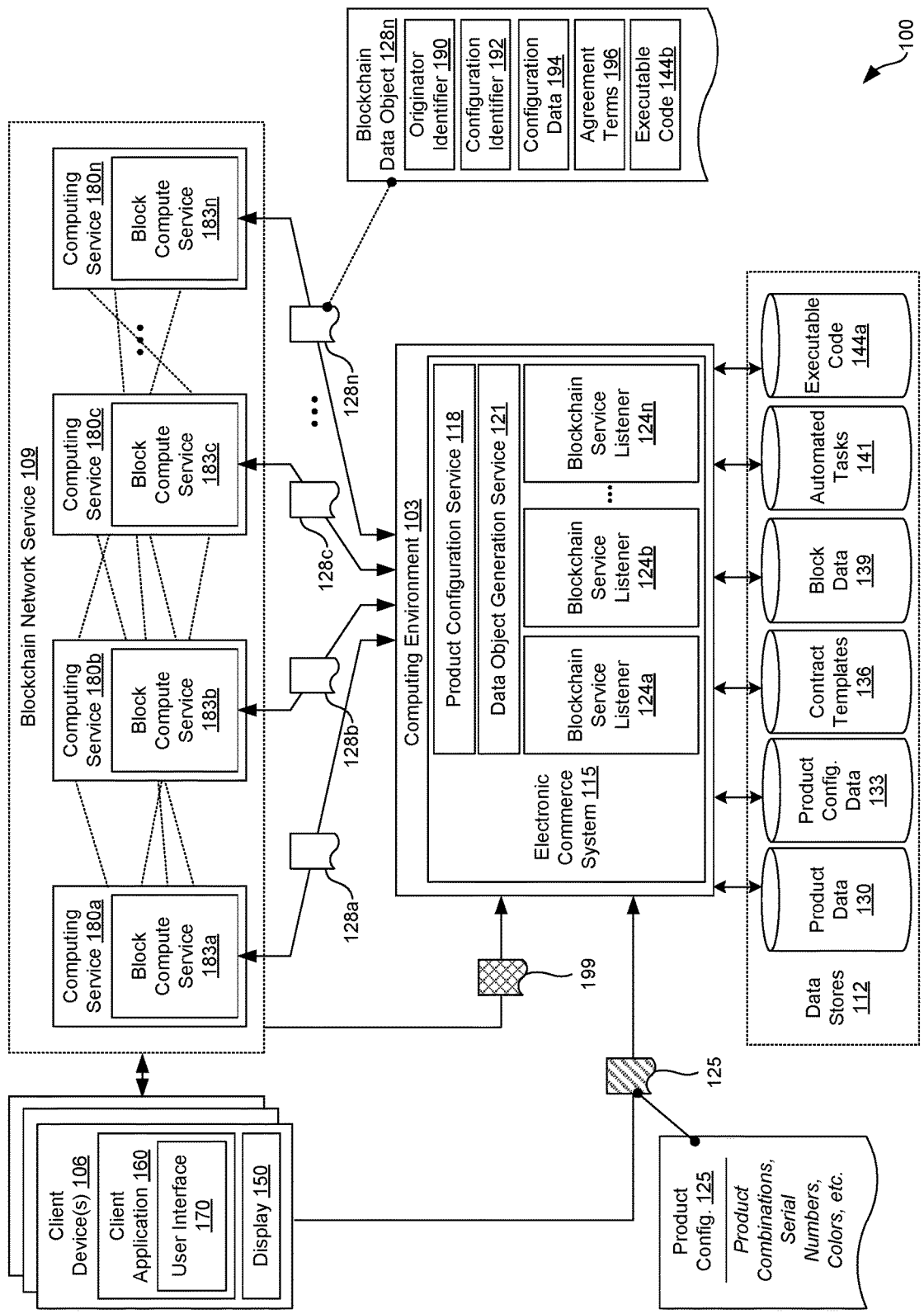
FIG. 2 is a drawing of a networked environment according to various embodiments of the present disclosure.

With reference to FIG. 2, shown is a networked environment 100 according to various embodiments. The networked environment 100 includes a computing environment 103, a client device 106, and a blockchain network service 109, which are in data communication with each other via a network. The network may include, for example, the Internet, intranets, extranets, wide area networks (WANs), local area networks (LANs), wired networks, wireless networks, or other suitable networks, etc., or any combination of two or more such networks. For instance, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications, services, or other functionality may be executed in the computing environment 103 according to various embodiments. Also, various data may be stored in one or more data stores 112 that are accessible to the computing environment 103. A single one of the data stores 112 shown in FIG. 1 may be representative of a plurality of data stores 112 as can be appreciated. The data stored in the data stores 112, for example, is associated with the operation of the various applications and/or functional entities described below.

The components executed on the computing environment 103, for example, include an electronic commerce system 115, and other applications, services, processes, systems, engines, or functionality not discussed in detail herein. In various embodiments, the electronic commerce system 115 may include a product configuration service 118, a data object generation service 121, and one or more blockchain service listeners 124a . . . 124n (collectively "blockchain service listeners 124").

The electronic commerce system 115 is executed in order to facilitate the online purchase of items and products over the network. The electronic commerce system 115 also performs various backend functions associated with the online presence of a merchant in order to facilitate the online purchase of items and products as will be described. For example, the electronic commerce system 115 generates network pages such as web pages or other types of network content that are provided to client devices 106 for the purposes of selecting items for purchase, rental, download, lease, or other form of consumption as will be described.

The product configuration service 118 is executed to provide an interface where users of the electronic commerce system 115, or any other system, may configure a physical item, a digital item, or a combination thereof, referred to herein as a configured product 125. For instance, in some embodiments, the product configuration service 118 is executed to serve up a user interface that permits the user to configure or customize a fashion outfit, which may include a shirt, pants or dress, shoes, or other fashion item. In alternative embodiments, the product configuration service 118 is executed to serve up a user interface that permits the user to customize a car or other vehicle, such as interior details, exterior details, and desired features. Accordingly, a user may interact with the product configuration service 118 using his or her client device 106 to generate a product configuration 125 that may be communicated to the computing environment 103.

In another embodiment, the product configuration service 118 is executed to serve up a user interface that permits the user to customize a room or other interior, such as paint color, room ornaments, rugs, furniture, window decorations, and other items. In some embodiments, the user may interact with a virtual reality device or an augmented reality device to generate the configured product 125 in a virtualized environment served up by the product configuration service 119. For instance, an interior designer can interact with an augmented reality device or a virtual reality device to create a layout comprising furniture, art, lamps, rugs, room ornaments, etc. in a room. In other embodiments, a user may create different pairings of products, such as a set of end tables that match a couch and a rug.

In another embodiment, the product configuration service 118 is executed to serve up a user interface that permits the user to customize an electronic device, such as a personal computer, a smartphone, a server computer, a tablet, or other device. As such, the product configuration service 118 may allow the user to select between and configure the electronic device to include one of a multitude of different displays, housings, processors, graphic chips, memory devices, communication modules, and other items as may be appreciated.

In yet another embodiment, the product configuration service 118 is executed to serve up a user interface or other environment that permits the user to customize network-accessible services. For instance, the product configuration service 118 may allow the user to select among different tiers of computing resources, such as processing resources, bandwidth resources, graphic processing resources, virtual machines, among others. Additionally, the user may select among different types of network services to employ.

A user may use the client device 106 to generate a product configuration 125 that may be communicated to the computing environment 103. While the product configuration service 118 is shown being a part of the electronic commerce system 115, in other embodiments, the product configuration service 118 may be executed in a third-party computing system.

The data object generation service 121 is executed to generate data objects that may be inserted into a blockchain 10, for instance, by communicating the data objects to the blockchain network service 109. In some embodiments, the data objects may include blockchain data objects 128a . . . 128n (collectively "blockchain data objects 128" or "blocks"), as will be discussed.

The data stored in the data store 112 includes, for example, product data 130, product configuration data 133, contract templates 136, block data 139, automated tasks 141, executable code 144a, 144b, and potentially other data. The product data 130 may include, for example, data pertaining to items or products in an electronic catalog that may be offered for consumption by the electronic commerce system 115 and/or configured using the product configuration service 118. To this end, the product data 130 may include an item name, a unique identifier for an item, a model number, a manufacturer name, a weight, a size, a color, as well as other information associated with an item or product. The product data 130 may include an identifier that uniquely identifies the product on the electronic commerce system 115, or may include an identifier that uniquely identifies the product on a variety of third-party network sites.

The product configuration data 133 may include one or more product configurations 125 generated by a user of a client device 106. A product configuration 125 may include a particular combination or configuration of items, such as physical or digital items. Additionally, the product configuration data 133 can include a name or an identifier that uniquely identifies an originator or an author of a particular product configuration 125.

Contract templates 136 may include standard terms or agreements that may be agreed upon between an operator of the electronic commerce system 115 and a user of the client device 106 prior to generating a product configuration 125. For instance, the contract template 136 may include a listing of benefits or other automated tasks 141 to be performed in association with an originator when a condition is satisfied. It is understood that the contract template 136 may include software routines or other executable code that analyze a scenario to determine whether a condition has been satisfied and, if so, perform an automated task 141.

The block data 139 may include information associated with blockchain data objects 128, or other data generated by the data object generation service 121. In some embodiments, a proof of submission of a blockchain data object 128 to the blockchain network service 109 may be stored in the data store 112 as block data 139.

The automated tasks 141 may include one or more tasks to be performed when a condition and an obligation under a blockchain data object 128 has been satisfied. In some embodiments, the automated tasks 141 can include conveying a referral benefit to an originator of a product configuration 125, for instance, when the product configuration 125 is subsequently purchased or otherwise consumed by downstream users, as will be discussed. The benefit may include a discount on subsequent purchases made through the electronic commerce system 115 in some embodiments.

In alternative embodiments, the benefit may include a payment made through a cryptocurrency or other currency. In other embodiments, the benefit may be reputational. For instance, the user account of the originator may be assigned a badge, a karma score, or other virtual reputation token if one or more of their product configurations 125 reaches a particular threshold. In other embodiments, the user account of the originator may be provided with a discounted or free subscription to an expedited shipping service, music application or service, video application or service, cloud storage service, or other service.

The executable code 144a, 144b may include code executable by the blockchain network service 109. In some embodiments, the executable code may be included in a blockchain data object 128 such that, when a condition has been satisfied, the executable code 144 is run (or executed) by a component of the blockchain network service 109. In some embodiments, the executable code 144 includes a software routine defined in a programming language, such as C, Python, Perl, C++, or other programming language. In other embodiments, the executable code 144 includes a script, software routine, or byte code executable by a processor of a computing system in the blockchain network service 109. The byte code may be generated by compiling a software routine prior to insertion in the blockchain data object 128.

The blockchain network service 109 may include various components configured to run the executable code 144. In some embodiments, the blockchain network service 109 may spawn threads or other virtual instances to run the executable code 144. In other embodiments, the blockchain network service 109 may include one or more virtual machines configured to run the executable code 144. Further, by running the executable code 144 in the blockchain network service 109, the blockchain network service 109 may be directed to perform one or more automated tasks 141, for instance, when a condition specified in a blockchain data object 128 has been met or otherwise satisfied.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, augmented reality devices, virtual reality devices, or other devices with like capability. The client device 106 may include a display 150. The display 150 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 160 and/or other applications. The client application 160 may be executed in a client device 106, for example, to access network content served up by the computing environment 103 or other servers, thereby rendering a user interface 170 on the display 150. To this end, the client application 160 may comprise, for example, a browser, a dedicated application, etc., and the user interface 170 may comprise a network page, an application screen, etc. The client device 106 may be configured to execute applications beyond the client application 160 such as, for example, email applications, social networking applications, word processors, spreadsheets, and/or other applications.

The blockchain network service 109 may include, for example, a server computer or other system implementing a blockchain protocol. The blockchain 10 may include a distributed database that is used to maintain a continuously growing list of data records stored as data objects, referred to as blocks. For instance, in some blockchain protocols, each block may contain a timestamp and a link to a previous block. A blockchain 10 is typically managed by a peer-to-peer network of computing services 180a . . . 180n (collectively "computing services 180") mutually adhering to a blockchain protocol for validating new blocks. In some examples, a subsequent block in a blockchain 10 may include a cryptographic hash or other digital hash of the previous block in the blockchain 10. As such, the blockchain 10 is resistant to unauthorized data modification. Once recorded, the data in any given block cannot be altered without the alteration of all subsequent blocks and the collusion of the entire network.

The computing services 180 may include one or more computing devices that may be arranged, for example, in one or more server banks or computer banks or other arrangements. As such, the computing services 180 may be distributed among many different geographical locations. Further, in some embodiments, the blockchain network service 109 may correspond to an elastic computing resource where the allotted capacity of processing, network, storage, or other computing-related resources may vary over time.

In addition to a blockchain protocol, in various embodiments, the blockchain network service 109 may implement a smart contract protocol. For instance, each of the computing services 180 may include a block compute service 183a . . . 183n (collectively "block compute services 183"). The block compute services 183 are executed to receive blockchain data objects 128 generated by the computing environment 103 and insert the blockchain data objects 128 into the blockchain 10 in accordance with a blockchain and/or a smart contract protocol. As such, the blockchain network service 109 acts as a decentralized ledger for storing product configurations 128 and agreements or conditions related thereto as blockchain data objects 128. The block compute services 183 may store and replicate the blockchain data objects 128 supervised by the network of computing services 180 that operate the blockchain 10.

Next, a general description of the operation of the various components of the networked environment 100 is provided. To begin, a user of a client device 106 may interact with the product configuration service 118 to configure an item or group of items, thereby generating a product configuration 125. For instance, a fashion designer or a fashion influencer may use their personal computer, television, or mobile device to access a user interface served up by the product configuration service 118 to come up with an outfit that may include a unique combination of a shirt, pants, shoes, fashion accessories, or other items. As may be appreciated, each of the items in the product configuration 125 may include a particular make, cut, model, color, or other characteristic. To encourage users to share product configurations 125, in some embodiments, the electronic commerce system 115, or other system, may provide the user that originated the product configuration 125 (the "originator") with a reward or other benefit.

However, to do so, it is not efficient to manually create a contract with each originator or for each product configuration 125, as hundreds to thousands of product configurations 125 could be created by hundreds to thousands of users. As such, the blockchain network service 109 may be employed to dynamically generate verifiable records of product configurations 128 and any agreements related thereto using the blockchain network service 109. Further, the blockchain data objects 128 may automatically perform a task in association with an originator of a product configuration 125, for instance, when a particular event occurs a particular condition is satisfied.

As such, when the computing environment 103 receives a product configuration 125 from a client device 106 associated with an originator, the data object generation service 121 may dynamically generate a blockchain data object 128. The blockchain data object 128 may include, for example, an originator identifier 190, a configuration identifier 192, configuration data 194, agreement terms 196, executable code 144, as well as other information. The originator identifier 190 may include an identifier, such as an alphanumeric identifier, that uniquely identifies an originator (or a user account of the originator) that created a product configuration 125. Similarly, the configuration identifier 192 may include an identifier, such as an alphanumeric identifier, that uniquely identifies a product configuration 125.

The configuration data 194 may include information associated with the product configuration 125, such as colors, makes, models, versions, serial numbers, identification numbers, or other information for products or characteristics that make up the product configuration 125. The executable code 144 can include, for example, machine-readable instructions that are executed when agreement terms 196 associated with the blockchain data object 128 are satisfied. Agreement terms 196 can include conditions in some examples. For instance, in some embodiments, a first portion of the executable code 144 is executed when a single condition is satisfied, such as when a subsequent user purchases a product configuration 125 created by the originator. Similarly, a second portion of the executable code 144 may be executed when all conditions of the blockchain data object 128 are satisfied. In various embodiments, the originator identifier 190, configuration identifier 192, configuration data 194, agreement terms 196, and executable code 144 may be included as a payload field of the blockchain data object 128 (e.g., a block) for insertion into the blockchain.

To prevent bots or other automated devices from registering several potential product configurations 125, in some embodiments, a completely-automated-public-Turing-test-to-tell-computers-and-humans-apart (CAPTCHA) test or other human-machine distinguishing test may be employed prior to submission of the product configuration 125 to the computing environment 103. By sending a blockchain data object 128 to the blockchain network service 109, it is understood that the blockchain data object 128 is stored and distributed among the computing services 180. The blockchain data object 128 is thus not susceptible to modification until the agreement terms 196 or other conditions have been satisfied.

Once a product configuration 125 has been created, in some embodiments, the electronic commerce system 115 may surface the product configuration 125 as a recommendation to other users of the electronic commerce system 115. In some embodiments, a product configuration 125 may be surfaced based at least in part on a number of impressions of conversions of the product configuration 125, a role or a popularity score determined for the originator, a fashion season or time of year, or other factor as may be appreciated. Further, the originator of the product configuration 125 may be provided with a unique uniform resource locator (URL) that directs other users to access, view, purchase, or otherwise consume the product configuration 125. In some embodiments, the originator is only rewarded for impressions or conversions achieved using the unique uniform resource locator generated for the product configuration 125.

In various embodiments, when the agreement terms 196 have been satisfied, the blockchain network service 109 will run the executable code 144. In some examples, the executable code 144 may include one or more routines that perform an automated task 141, as agreed upon by the originator and the electronic commerce system 115. In some embodiments, the blockchain network service 109 may spawn an event 199 that may be communicated to the electronic commerce system 115 that directs the electronic commerce system 115 to perform one of the automated tasks 141 in association with the originator of the product configuration 125. For instance, the originator of the product configuration 125 may be provided with a benefit.

Figure 3:
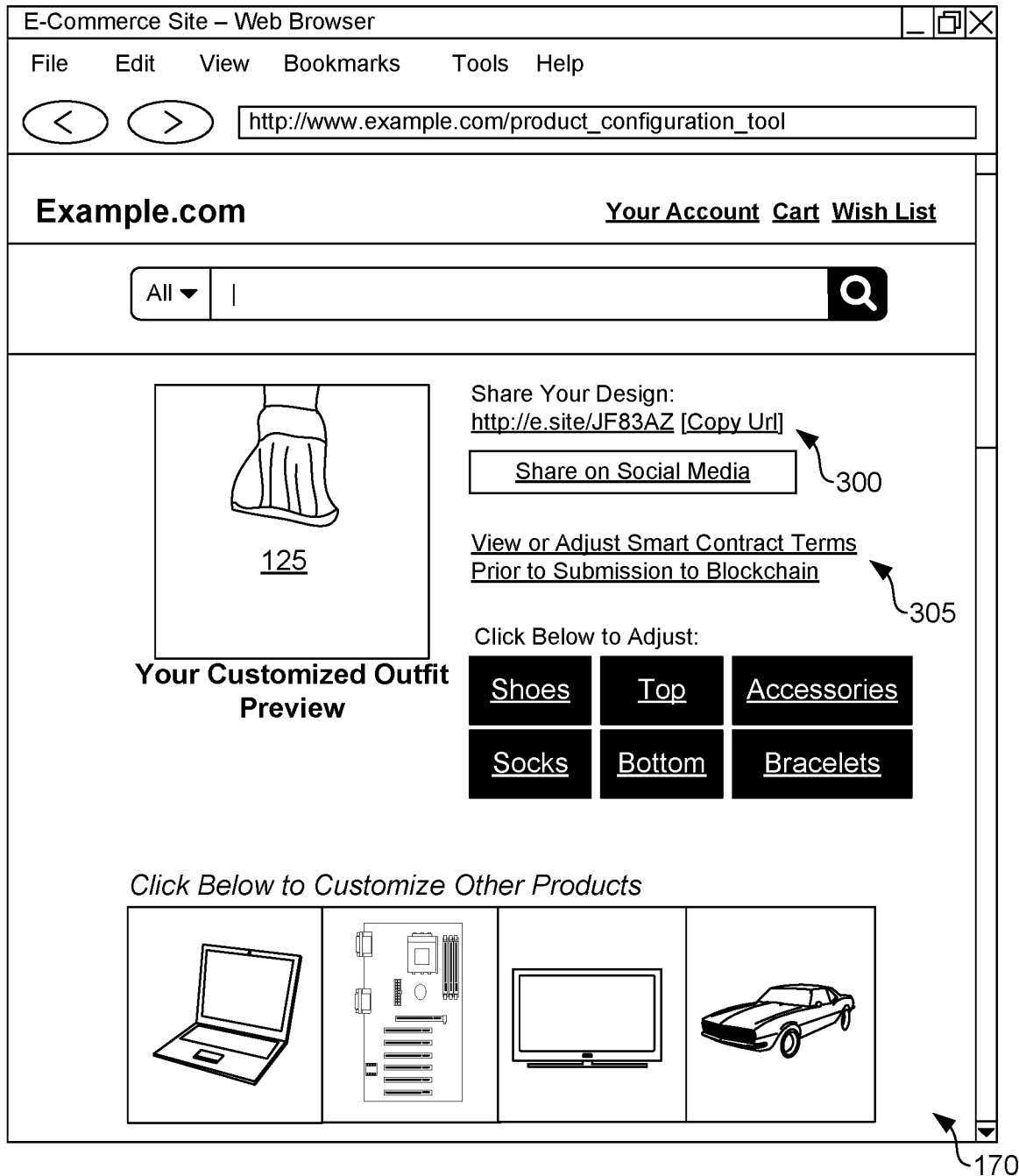
FIG. 3 is a pictorial diagram of an example user interface rendered by a client device in the networked environment of FIG. 2 according to various embodiments of the present disclosure.

Turning now to FIG. 3, an example of a user interface 170 that may be generated by the product configuration service 118 or the electronic commerce system 115 is shown according to various embodiments. The user interface 170 may permit a user, also referred to as an originator, to configure a physical item, a digital item, or a combination thereof, thereby generating a configured product 125. In the non-limiting example of FIG. 3, the configured product 125 includes an outfit having a particular arrangement of a skirt, shoes, top, accessories, or other items. An image of the product configuration 125 may be dynamically generated and updated based on selections made by the user. By interacting with the user interface 170, the user can select these items from an item catalog maintained by the electronic commerce system 115.

After a product configuration 125 has been generated, the user interface 170 may provide the originator with a unique uniform resource locator 300 that may be used to share the product configuration 125 with downstream users. For instance, the originator may share the unique uniform resource locator 300 on social media sites or other network sites that may lead to impressions or conversions being achieved. Also, the user interface 170 may include a hyperlink or other user interface component that permits the originator to view, agree to, or modify agreement terms 196 that will be converted into code for use in a blockchain data object 128.

While FIG. 3 depicts the configuration of an outfit, in alternative embodiments, the product configuration service 118 is executed to serve up a user interface 170 that permits the user to customize a car or other vehicle, a house or a room of a house, an electronic device, a media playlist having audio or video, or other item as may be appreciated.

Figure 4:
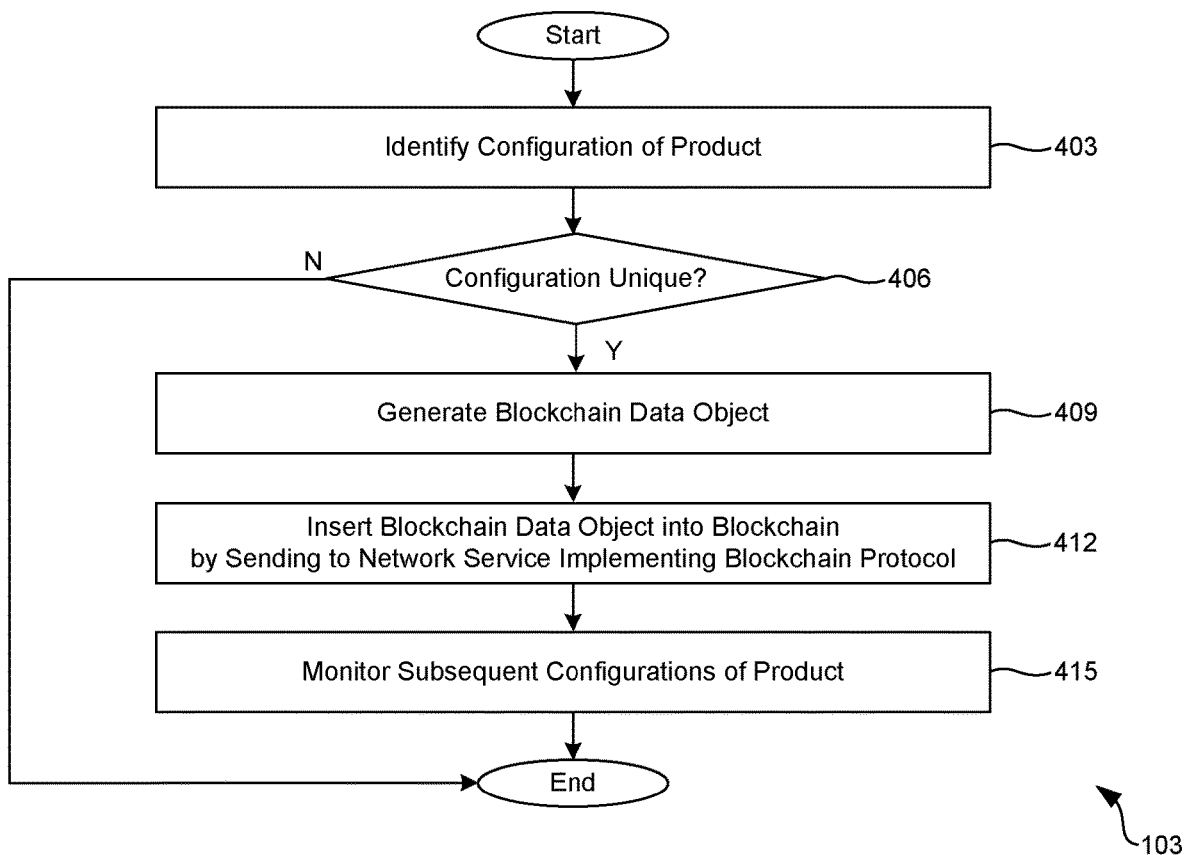
FIG. 4 is a flowchart illustrating one example of functionality implemented as portions of a computing environment in the networked environment of FIG. 2 according to various embodiments of the present disclosure.

Moving on to FIG. 4, a flowchart is shown that provides one example of the operation of a portion of the electronic commerce system 115 and/or the data object generation service 121 according to various embodiments. It is understood that the flowchart of FIG. 4 provides merely an example of the many different types of functional arrangements that may be employed to implement the operation of the portion of the electronic commerce system 115 and/or the data object generation service 121 as described herein. As an alternative, the flowchart of FIG. 4 may be viewed as depicting an example of elements of a method implemented in the computing environment 103 according to one or more embodiments.

Beginning with 403, the computing environment 103 may identify a configuration of a product. As noted above, a user of a client device 106 may interact with the product configuration service 118 to configure a product or other item, thereby generating a product configuration 125. For instance, a user may use the product configuration service 118 to tailor a customized software package of files for download or installation on a client device 106. To encourage the user to share his or her product configuration 125, in some embodiments, the electronic commerce system 115, or other system, may perform a predetermined task, such as providing the originator that created the product configuration 125 with a reward or other benefit. As such, the computing environment 103 may identify a product configuration 125 as it is received from the client device 106. In various embodiments, the product configuration 125 may include configuration data 194. For instance, the configuration data may include various combinations and configurations of items or products, colors, serial numbers, identification numbers, or other information for products or characteristics that make up the product configuration 125.

Next, in 406, the computing environment 103 may determine whether the product configuration 125 is unique. As may be appreciated, in some situations, a same configuration of a product may have already occurred in the product configuration service 118. For instance, a configuration of a car or other vehicle may have a limited set of potential configurations. As such, it may likely that two users come up with a same product configuration 125. Thus, in some embodiments, it may be desirable to only reward a first originator of the product configuration 125, as opposed to subsequent originators. In alternative embodiments, however, each of the originators may be provided with a benefit based on the number of impressions or conversions achieved by the respective originator. As such, in some embodiments, determining whether the configuration is unique may not be performed. In any event, if the product configuration 125 is not unique, in some embodiments, the process may proceed to completion. The computing environment 103 may notify the blockchain network service 109 every instance in which the product configuration 125 is accessed, viewed, purchased, or consumed.

In some embodiments, to be unique, each characteristic of the product configuration 125 must be different than a previously-generated product configuration 125. For instance, nearly identical outfits may be considered non-unique if a first outfit has a red shirt while the second outfit has a blue shirt. In alternative embodiments, a score may be generated for the product configuration 125 to determine whether it is unique. If the score exceeds a predetermined threshold (e.g., the product configuration is 95% unique), the product configuration 125 may be deemed as unique.

Alternatively, if the computing environment 103 determines that the product configuration 125 is unique, the process may proceed to 409. In 409, the data object generation service 121 may dynamically generate a blockchain data object 128, for instance, in response to the computing environment 103 receiving a product configuration 125 that is unique. In some embodiments, the blockchain data object 128 may include a JAVASCRIPT® object notation (JSON), binary JSON (BSON), extensible markup language (XML), yet another markup language (YAML), or other suitable data object capable of communication over a network. In some embodiments, the blockchain data object 128 is generated in accordance with standards or specifications established by the blockchain network service 109.

Further, the blockchain data object 128 may be generated by performing an automatic translation of contract terms to machine-executable code or instructions. For instance, terms of a contract, or agreement terms 196, may be converted to software routines that, if invoked, performed predetermined actions or automated tasks 141.

According to various embodiments, the blockchain data object 128 may include, for example, an originator identifier 190, a configuration identifier 192, configuration data 194, agreement terms 196, executable code 144, as well as other information. The originator identifier 190 may include an identifier, such as a string of alphanumeric characters, that uniquely identifies an originator or a user account of the originator that created a product configuration 125. Similarly, the configuration identifier 192 may include an identifier, such as a string of alphanumeric characters, that uniquely identifies a product configuration 125. In some embodiments, the configuration identifier 192 may be included as a portion of the unique uniform resource locator 300 provided to the originator to share the product configuration 125.

The configuration data 194 may include information associated with the product configuration 125, such as colors, serial numbers, identification numbers, or other information for products or characteristics that make up the product configuration 125. The executable code 144 can include, for example, machine-readable instructions that are executed when the agreement terms 196 associated with the blockchain data object 128 are satisfied.

In 412, the computing environment 103 may insert the blockchain data object 128 by sending the blockchain data object 128 to the blockchain network service 109. By sending a blockchain data object 128 to the blockchain network service 109, it is understood that the blockchain data object 128, or a record thereof, is stored and distributed among the computing services 180. The blockchain data object 128 is thus not susceptible to modification until agreement terms 196 specified in the blockchain data object 128 have been satisfied.

Next, in 415, the computing environment 103 may monitor subsequent configurations of an item or a product. Additionally, the computing environment 103 may monitor any impressions or conversions achieved by the originator, for instance, through the unique uniform resource locator 300, as discussed above with respect to FIG. 3. If a user uses the unique uniform resource locator 300 shared by the originator, for instance, to view, purchase, or otherwise consume a product having the product configuration 125, an automated task 141 may be performed in association with the originator, such as providing the originator with a benefit. Thereafter, the process may proceed to completion.

The blockchain network service 109 may maintain a status of performance of various conditions of the blockchain data objects 128. In various embodiments, when one or more of the agreement terms 196 have been satisfied, the blockchain network service 109 will run executable code 144 defined in the blockchain data object 128.

In some examples, the executable code 144 may include one or more routines that perform an automated task 141, as agreed upon by the originator and the electronic commerce system 115 prior to the blockchain data object 128 being generated and inserted into the blockchain 10. In some embodiments, the executable code 144 directs the blockchain network service 109 to spawn an event 199 that may be communicated to the electronic commerce system 115 that directs the electronic commerce system 115 to perform one of the automated tasks 141 in associated with the originator of the product configuration 125. For instance, the originator of the product configuration 125 may be provided with a benefit.

Figure 5:
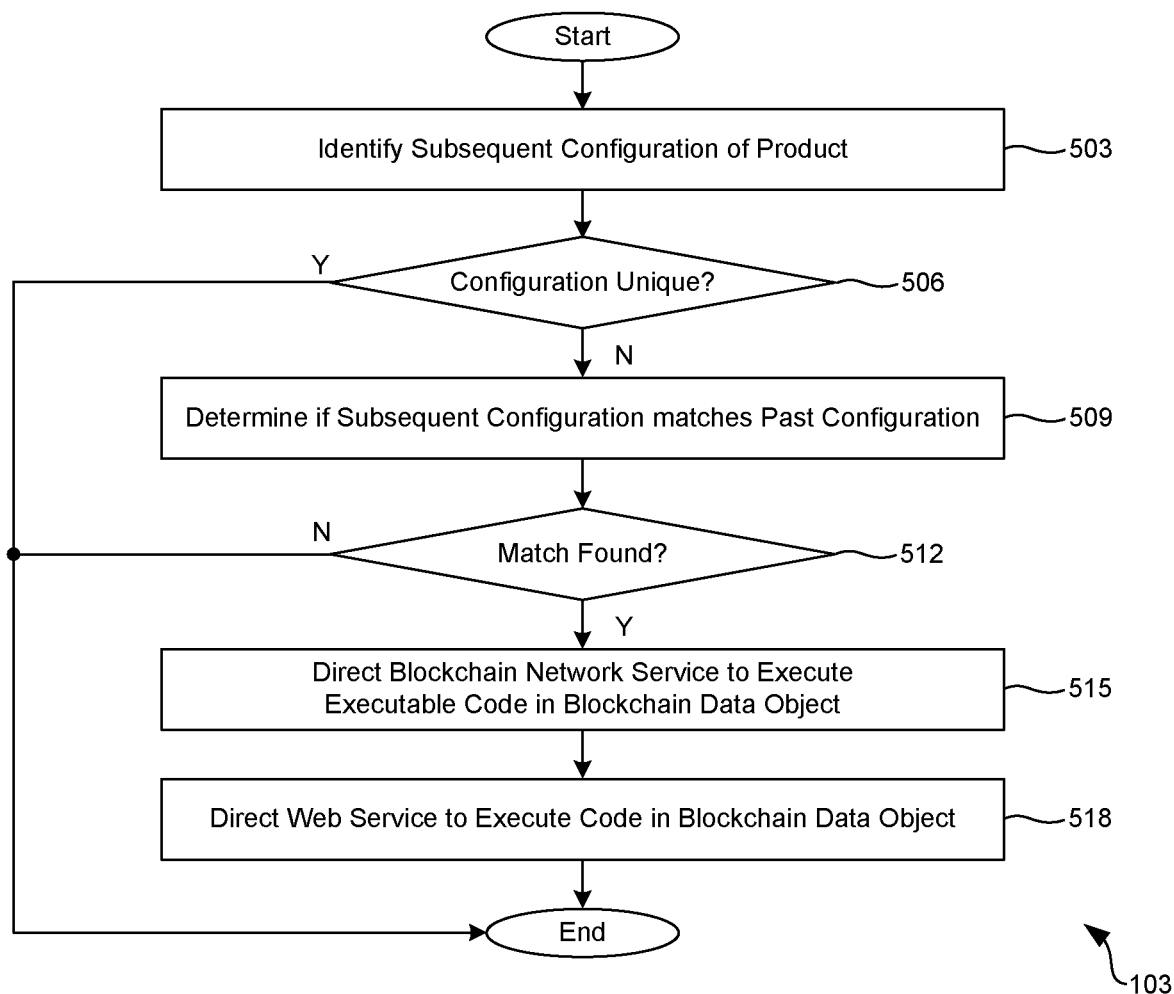
FIG. 5 is a flowchart illustrating another example of functionality implemented as portions of a computing environment in the networked environment of FIG. 2 according to various embodiments of the present disclosure.

Referring next to FIG. 5, a flowchart is shown that provides one example of the operation of a portion of the electronic commerce system 115 according to various embodiments. It is understood that the flowchart of FIG. 5 provides merely an example of the many different types of functional arrangements that may be employed to implement the operation of the portion of the electronic commerce system 115 as described herein. As an alternative, the flowchart of FIG. 5 may be viewed as depicting an example of elements of a method implemented in the computing environment 103 according to one or more embodiments.

Beginning with 503, the computing environment 103 may identify a subsequent configuration of a product performed using the product configuration service 118. For instance, after a first user creates a product configuration 125, the product may be monitored to determine whether a subsequent user creates the same product configuration 125.

As such, in 506, the computing environment 103 may determine whether the configuration of the product is unique. In other words, the computing environment 103 may determine whether the configuration of a product matches a previously-generated product configuration 125. If the configuration is unique, the process may proceed to completion, or the process may process to 409 described above with respect to FIG. 4.

Alternatively, if the configuration of the product was unique, the process may proceed to 509. In 509, the computing environment 103 determines if the subsequent configuration of the product matches a product configuration 125 specified in any of the blockchain data objects 128 stored in the blockchain. In some embodiments, a referral URL may be used to determine whether the product configuration purchased or otherwise consumed matches a previously-generated product configuration 125. In some embodiments, the computing environment 103 may send a request to the network service implementing the blockchain protocol (e.g., the blockchain network service 109) to determine whether the subsequent configuration of the product matches any previously-generated product configurations 125, for instance, based on a comparison of product configuration data 133.

Next, in 512, the computing environment 103 may determine whether a match has been found or located. In other words, the computing environment 103 may determine whether the subsequent configuration of the product matches a previously-generated product configuration 125. If no match has been found, the process may proceed to completion.

In the alternative, if the computing environment 103 has determined that the subsequent configuration of the product matches a previously-generated product configuration 125, the process may proceed to 515. In 515, the computing environment 103 may direct the blockchain network service 109 to run executable code set forth in the blockchain data object 128. For instance, the blockchain data object 128 may include a function or a routine that executes when the computing environment 103 indicates that all conditions or obligations in the agreement terms 196 have been satisfied. It is understood that this may occur multiple times as a product configuration 125 created by an originator is purchased or otherwise consumed multiple times by various users. In some embodiments, the executable code 144 may be ran in a virtual machine of the blockchain network service 109. In various embodiments, the executable code 144 includes a function or other routine that performs a task in association with the user account of the originator.

In some embodiments, the blockchain network service 109 will send an automated task 141 to the computing environment 103 to perform. As such, the computing environment 103 may include one or more blockchain service listeners 124 configured to listen for and process communications from the blockchain network service 109. For instance, when a communication from the blockchain network service 109 is received, the blockchain service listener 124 may identify one of the automated tasks 141 to perform and cause the automated task 141 to be performed. Thereafter, the process may proceed to completion.

Figure 6:
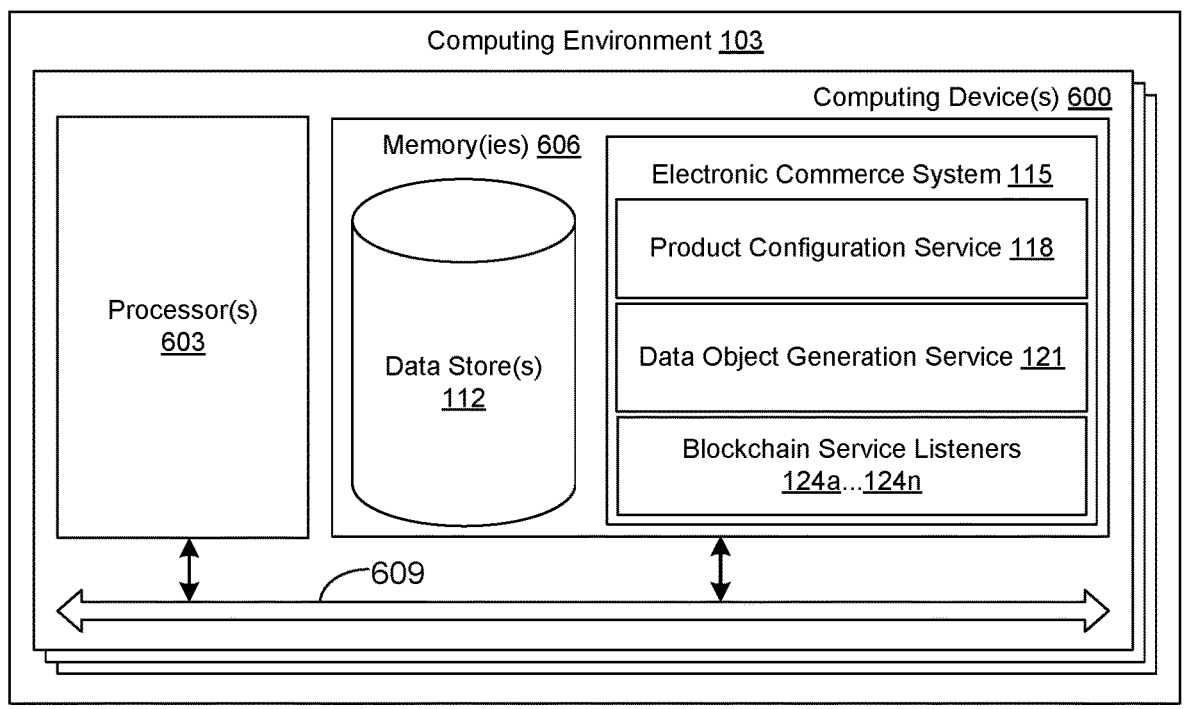
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 115, the product configuration service 118, the data object generation service 121, the blockchain service listener 124, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 115, the product configuration service 118, the data object generation service 121, the blockchain service listener 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts of FIGS. 4 and 5 show the functionality and operation of an implementation of portions of the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the product configuration service 118, the data object generation service 121, and the blockchain service listener 124, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 115, the product configuration service 118, the data object generation service 121, and the blockchain service listener 124, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
program instructions stored in memory and executable in the at least one computing device that, when executed, direct the at least one computing device to:
provide access to an electronic commerce system having a plurality of items available to purchase or consume by a plurality of user accounts;
receive a product configuration describing a combination of items, the combination of items being created by one of the user accounts corresponding to an originator using a product configuration service, and the combination of items being a subset of the items available to purchase or consume using the electronic commerce system;
determine that the product configuration is unique by comparing the product configuration to a database of past product configurations;
in response to the product configuration being unique, generate a blockchain data object that is unique to the product configuration comprising information describing the product configuration;
direct a blockchain network service implementing a blockchain protocol to insert the blockchain data object into a blockchain; and
in response to the product configuration created by the originator being accessed or consumed by another one of the user accounts, direct the blockchain network service to perform a predetermined task in association with the one of the user accounts corresponding to the originator, wherein the predetermined task comprises a referral benefit conferred by the electronic commerce system.

2. The system of claim 1, wherein the blockchain data object further comprises:
a first identifier that uniquely identifies the product configuration; and
a second identifier that uniquely identifies the one of the user accounts corresponding to the originator that created the product configuration.

3. The system of claim 1, wherein the blockchain data object further comprises executable code that, when executed, directs the blockchain network service to perform the predetermined task in association with the one of the user accounts corresponding to the originator.

4. The system of claim 3, wherein the at least one computing device is further directed to compile a routine into the executable code prior to generating the blockchain data object.

5. The system of claim 4, wherein the executable code is executed in a virtual machine of the blockchain network service.

6. The system of claim 1, wherein the at least one computing device is further directed to notify the blockchain network service an instance in which the product configuration is accessed or consumed.

7. The system of claim 1, wherein the at least one computing device is further directed to generate a unique uniform resource locator at which the product configuration may be accessed over a network.

8. The system of claim 7, wherein the product configuration is identified as being accessed or consumed by another one of the user accounts based at least in part on an impression or a conversion achieved using the unique uniform resource locator.

9. The system of claim 8, wherein the unique uniform resource locator comprises an identifier that uniquely identifies the product configuration created by the one of the user accounts corresponding to the originator.

10. The system of claim 8, wherein the product configuration comprises a plurality of identifiers, individual ones of the plurality of identifiers uniquely identifying items in the combination of items selected from an electronic catalog of the electronic commerce system, the product configuration further comprising an arrangement of the items selected from the electronic catalog.

11. A computer-implemented method, comprising:
   maintaining, via at least one of one or more computing devices, an electronic catalog accessible by an electronic commerce system, the electronic catalog having a plurality of items available to purchase or consume by a plurality of user accounts associated with the electronic commerce system;
   receiving, via at least one of the one or more computing devices, a product configuration describing a combination and arrangement of items from the electronic catalog generated by one of the user accounts of an originator using a product configuration service;
   determining, via at least one of the one or more computing devices, that the product configuration is unique;
   in response to the product configuration being unique, generating, by via at least one of the one or more computing devices, a blockchain data object for the product configuration;
   directing, via at least one of the one or more computing devices, a blockchain network service implementing a blockchain protocol to insert the blockchain data object into a blockchain;
   identifying, via at least one of the one or more computing devices, that the product configuration generated by the originator was accessed or consumed by another user account; and
   executing, via at least one of the one or more computing devices, code specified in the blockchain data object that performs a predetermined task in association with the one of the user accounts of the originator.

12. The computer-implemented method of claim 11, further comprising generating, via at least one of the one or more computing devices, a uniform resource locator from which the product configuration may be accessed, wherein the uniform resource locator comprises an identifier that uniquely identifies the product configuration.

13. The computer-implemented method of claim 12, further comprising notifying, via at least one of the one or more computing devices, the blockchain network service that an impression or a conversion has been achieved using the uniform resource locator.

14. The computer-implemented method of claim 11, further comprising generating, via at least one of the one or more computing devices, the product configuration based on a selection of a plurality of items in a user interface, wherein the product configuration comprises an arrangement of the items.

15. The computer-implemented method of claim 11, wherein the blockchain data object comprises at least one of: an identifier that uniquely identifies the product configuration; an identifier that uniquely identifies the one of the user accounts of the originator that created the product configuration; configuration data associated with the product configuration; an agreement term; or executable code.

16. The computer-implemented method of claim 15, further comprising compiling, via at least one of the one or more computing devices, a routine into the executable code prior to generating the blockchain data object.

17. The computer-implemented method of claim 11, wherein the predetermined task comprises a referral benefit conferred by the electronic commerce system.

* * * * *